United States Patent
Higashiuchi et al.

(10) Patent No.: US 11,352,562 B2
(45) Date of Patent: Jun. 7, 2022

(54) EPOXY RESIN, EPOXY RESIN COMPOSITION, EPOXY RESIN CURED PRODUCT AND COMPOSITE MATERIAL

(71) Applicant: Showa Denko Materials Co., Ltd., Tokyo (JP)

(72) Inventors: Tomoko Higashiuchi, Tokyo (JP); Naoki Maruyama, Tokyo (JP); Kazumasa Fukuda, Tokyo (JP); Yoshitaka Takezawa, Tokyo (JP); Hideyuki Katagi, Tokyo (JP); Yuki Nakamura, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/758,972

(22) PCT Filed: Apr. 9, 2019

(86) PCT No.: PCT/JP2019/015427
§ 371 (c)(1),
(2) Date: Apr. 24, 2020

(87) PCT Pub. No.: WO2019/198703
PCT Pub. Date: Oct. 17, 2019

(65) Prior Publication Data
US 2020/0325398 A1    Oct. 15, 2020

(30) Foreign Application Priority Data

Apr. 10, 2018  (JP) .............................. JP2018-075649
Apr. 10, 2018  (WO) .................. PCT/JP2018/015114

(51) Int. Cl.
*C09K 19/38*     (2006.01)
*C08L 63/00*     (2006.01)
*C08G 59/18*     (2006.01)
*C08J 5/24*      (2006.01)

(52) U.S. Cl.
CPC ............ *C09K 19/388* (2013.01); *C08L 63/00* (2013.01); *C08G 59/182* (2013.01); *C08J 5/24* (2013.01)

(58) Field of Classification Search
CPC ..... C09K 19/388; C08L 63/00; C08G 59/182; C08J 5/24
USPC ........................................................ 523/400
See application file for complete search history.

(56) References Cited

U.S. PATENT DOCUMENTS

| | | | | |
|---|---|---|---|---|
| 2003/0229159 A1* | 12/2003 | Akatsuka | ............... | C08G 59/02 523/457 |
| 2017/0349695 A1* | 12/2017 | Katagi | ....................... | C08J 5/18 |
| 2018/0155489 A1 | 6/2018 | Ushiyama et al. | | |
| 2019/0055344 A1 | 2/2019 | Tanaka et al. | | |

FOREIGN PATENT DOCUMENTS

| | | |
|---|---|---|
| JP | 2002-194058 A | 7/2002 |
| JP | 2011-153265 A | 8/2011 |
| WO | WO-2016/104772 A1 | 6/2016 |
| WO | WO-2016/199857 A1 | 12/2016 |
| WO | WO-2017/145411 A1 | 8/2017 |
| WO | WO-2018/070052 A1 | 4/2018 |
| WO | WO-2018/070534 A1 | 4/2018 |
| WO | WO-2018/070535 A1 | 4/2018 |

OTHER PUBLICATIONS

English-language translation of the Written Opinion of the International Searching Authority issued in international patent application No. PCT/JP2019/015427, dated Jul. 9, 2019.

* cited by examiner

*Primary Examiner* — David T Karst
(74) *Attorney, Agent, or Firm* — Faegre Drinker Biddle & Reath LLP

(57) ABSTRACT

An epoxy resin, comprising an epoxy compound having a mesogenic structure, and having a value of $\eta'2/\eta'1$ equal to 3 or less, wherein $\eta'1$ is an initial dynamic shear viscosity (Pa·s) and $\eta'2$ is a maximum value of dynamic shear viscosity (Pa·s), in a measurement of dynamic shear viscosity.

7 Claims, No Drawings

EPOXY RESIN, EPOXY RESIN COMPOSITION, EPOXY RESIN CURED PRODUCT AND COMPOSITE MATERIAL

TECHNICAL FIELD

The invention relates to an epoxy resin, an epoxy resin composition, an epoxy resin cured product and a composite material.

BACKGROUND ART

Epoxy resin is widely used as a matrix resin of fiber-reinforced plastics (FRPs). Recently, epoxy resin is also used as a matrix resin of FRPs for aerospace industries which require a high level of properties such as fracture toughness, elasticity and heat resistance. However, although thermosetting resins, such as epoxy resin, have superior heat resistance, they tend to have less fracture toughness as compared with thermoplastic resins.

As a method for improving the fracture toughness of epoxy resin, a method of increasing the orientation of molecules in a cured product by introducing a mesogenic structure into the molecule is known, for example.

An epoxy resin having a mesogenic structure in its molecule (hereinafter, also referred to as a mesogen-containing epoxy resin) has higher crystallinity and viscosity as compared with other epoxy resins. Therefore, fluidity may not be sufficient during processing. Therefore, in order to improve the fluidity of a mesogen-containing epoxy resin, a method of obtaining an epoxy compound having a specific molecular weight via a reaction between an epoxy monomer having a mesogenic structure and a divalent phenol compound has been proposed (see, for example, Patent Document 1).

PRIOR ART DOCUMENT

Patent Document

[Patent Document 1] International Publication No. WO 2016-104772

SUMMARY OF THE INVENTION

Problems to be Solved by the Invention

The mesogen-containing epoxy resin obtained by the method described in Patent Document 1 achieves a lowered softening point, but still has high crystallinity. As a result, it is difficult to coat the same without a solvent due to high viscosity under the temperature conditions during processing, and there is room for improvement of the epoxy resin from the viewpoint of processing compatibility. In addition, even if the viscosity could be lowered under the temperature conditions during processing, other factors that may affect the processing compatibility of the epoxy resin need to be considered (for example, viscosity is increased when the epoxy resin is allowed to flow in a mold while applying a shear stress).

In view of the foregoing, the invention aims to provide an epoxy resin and an epoxy resin composition having excellent processing compatibility. The invention also aims to provide an epoxy resin cured product and a composite material obtained by using the epoxy resin or the epoxy resin composition.

Means for Solving the Problem

The means for solving the problem include the following embodiments.

<1> An epoxy resin, comprising an epoxy compound having a mesogenic structure, and having a value of $\eta'2/\eta'1$ equal to 3 or less, wherein $\eta'1$ is an initial dynamic shear viscosity (Pa·s) and $\eta'2$ is a maximum value of dynamic shear viscosity (Pa·s), in a measurement of dynamic shear viscosity.

<2> The epoxy resin according to <1>, comprising an epoxy compound represented by the following Formula (1):

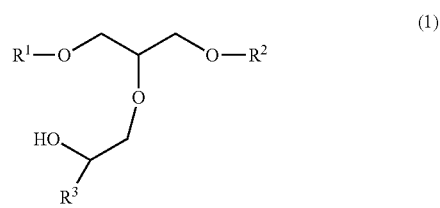

(1)

wherein, in Formula (1), each of $R^1$, $R^2$ and $R^3$ independently represents a monovalent group, at least one of the monovalent groups represented by $R^1$, $R^2$ and $R^3$ includes a mesogenic structure, and at least one of the monovalent groups represented by $R^1$, $R^2$ and $R^3$ has an epoxy group.

<3> The epoxy resin according to <1> or <2>, comprising an epoxy compound A having two or more mesogenic structures and at least one phenylene group, and an epoxy compound B having two or more mesogenic structures and at least one divalent biphenyl group.

<4> The epoxy resin according to any one of <1> to <3>, comprising an epoxy compound having two aromatic rings that form a divalent biphenyl structure, and having mesogenic structures that are independently bonded to each of the two aromatic rings, wherein at least one of the mesogenic structures is bonded to the aromatic ring at an angle to the molecular axis of the biphenyl structure.

<5> The epoxy resin according to any one of <1> to <3>, wherein the initial dynamic shear viscosity $\eta'1$ is 200 Pa·s or less.

<6> An epoxy resin, comprising an epoxy compound represented by the following Formula (1):

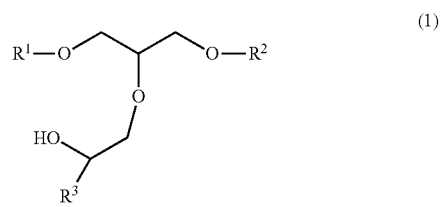

(1)

wherein, in Formula (1), each of $R^1$, $R^2$ and $R^3$ independently represents a monovalent group, at least one of the monovalent groups represented by $R^1$, $R^2$ and $R^3$ includes a mesogenic structure, and at least one of the monovalent groups represented by $R^1$, $R^2$ and $R^3$ has an epoxy group.

<7> An epoxy compound having a main chain comprising two mesogenic structures and one branch, and having a ratio of area B to area A of 3% or more, wherein the area A is a total area of peaks derived from epoxy compounds having a main chain including two or more mesogenic structures, and the area B is an area of a peak derived from the epoxy compound, as shown in a chart obtained by gel permeation chromatography (GPC).

<8> An epoxy resin composition, comprising the epoxy resin according to at least one of <1> to <7>, and a curing agent.

<9> An epoxy resin composition, comprising an epoxy compound having a mesogenic structure and a curing agent, and having a value of $\eta'4/\eta'3$ equal to 3 or less, wherein $\eta'3$ is an initial dynamic shear viscosity (Pa·s) and $\eta'4$ is a maximum value of dynamic shear viscosity (Pa·s), in a measurement of dynamic shear viscosity.

<10> An epoxy resin cured product obtained by curing the epoxy resin composition according to <8> or <9>.

<11> A composite material, comprising the epoxy resin cured product according to <10>, and a reinforcing member.

Effect of the Invention

According to the invention, an epoxy resin and an epoxy resin composition having excellent processing compatibility, and an epoxy resin cured product and a composite material obtained by using the epoxy resin or the epoxy resin composition are provided.

EMBODIMENTS FOR IMPLEMENTING THE INVENTION

In the following, embodiments for implementing the invention are explained. However, the invention is not limited to the embodiments. The elements of the embodiments (including steps) are not essential, unless otherwise stated. The numbers and numerical ranges do not limit the invention as well.

In the disclosure, the "process" refers not only to a process that is independent from the other steps, but also to a step that cannot be dearly distinguished from the other steps, as long as the aim of the process is achieved.

In the disclosure, the numerical range represented by "from A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there are more than one kind of substances corresponding to a component of a composition, the content of the component refers to a total content of the substances, unless otherwise stated.

In the disclosure, when there are more than one kind of particles corresponding to a component of a composition, the particle size of the component refers to a particle size of a mixture of the more than one kind of particles.

In the disclosure, the epoxy compound refers to a compound having an epoxy group in its molecule. The epoxy resin refers to a collective concept of epoxy compounds that are not in a cured state.

Epoxy Resin (First Embodiment)

The epoxy resin of the first embodiment is an epoxy resin, comprising an epoxy compound having a mesogenic structure, and having a value of $\eta'2/\eta'1$ equal to 3 or less, wherein $\eta'1$ is an initial dynamic shear viscosity (Pa·s) and $\eta'2$ is a maximum value of dynamic shear viscosity (Pa·s), in a measurement of dynamic shear viscosity.

The epoxy resin having the configuration as specified above exhibits excellent processing compatibility. More specifically, the inventors have found that an epoxy resin having a mesogenic structure may have an increased viscosity upon application of shear stress, irrespective of temperature conditions. Based on this finding, the inventors have found that an epoxy resin having a value of $\eta'2/\eta'1$ equal to 3 or less, obtained in measurement of dynamic shear viscosity, is less likely to increase the viscosity upon application of shear stress, and that the epoxy resin is able to maintain a favorable fluidity during a process in which shear stress is applied prior to curing, such as mixing or kneading. Accordingly, the epoxy resin of the disclosure is highly compatible with respect to various types of processing.

The dynamic shear viscosity of an epoxy resin can be measured by using a rheometer. Specifically, the dynamic shear viscosity is measured with a gap between a parallel plate and a stage of a rheometer of 0.05 mm, a frequency of 0.5 Hz, a strain of 8000%, and a temperature of 80° C. (constant), over 80 minutes in a continuous manner. As the rheometer, MCR-301 from Anton-Paar GmbH may be used, for example.

The value of $\eta'2/\eta'1$ is not specifically limited as long as it is 3 or less. The smaller the value is, the epoxy resin tends to become more stable in viscosity upon application of shear stress is, and have more favorable processing compatibility. The value of $\eta'2/\eta'1$ is preferably 2.5 or less, more preferably 2 or less.

The absolute value of the dynamic shear stress obtained by the measurement is not specifically limited. From the viewpoint of fluidity of the epoxy resin, the initial dynamic viscosity $\eta'1$ is preferably 200 Pa·s or less, more preferably 100 Pa·s or less, further preferably 50 Pa·s or less.

The method for obtaining an epoxy resin having a value of $\eta'2/\eta'1$ of 3 or less, obtained in measurement of dynamic shear viscosity, is not particularly limited. For example, the epoxy resin may be obtained by appropriately controlling the structure of an epoxy compound having a mesogenic structure (mesogen-containing epoxy compound) included in the epoxy resin.

Examples of the mesogenic structure of a mesogen-containing epoxy compound include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these structures are linked via a linking group.

A mesogen-containing epoxy compound tends to form, in a cured product, a higher-order structure in which molecules are oriented in a unidirectional manner, due to a linear and stiff molecular structure thereof. In the disclosure, the higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of an island, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity of a cured product.

Whether or not a smectic structure is formed in a cured product can be determined by X-ray diffraction measurement by using, for example, an X-ray diffractometer from Rigaku Corporation. When the measurement is performed using CuKα1 line under a tube voltage of 40 kV, a tube current of 20 mA and a measurement range 2θ=2° to 30°, and a diffraction peak is observed in a range of 2θ=2° to 10°, it is determined that a smectic structure is formed in a cured product.

The mesogenic structure of a mesogen-containing epoxy compound may be a structure represented by the following Formula (M).

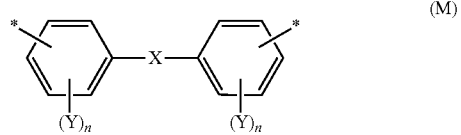

In Formula (M), X represents a single bond or a linking group that includes at least one divalent group selected from the following Group (A). Each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a site to bond to an adjacent atom.

Group (A)

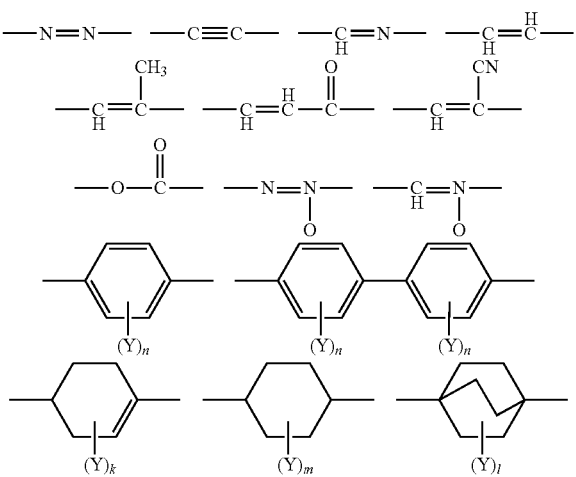

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In Group (A), each Y preferably independently does not exist (i.e., n, k, m or l is 0) or is an alkyl group having 1 to 3 carbon atoms, more preferably does not exist or is a methyl group, further preferably does not exist.

In the mesogenic structure represented by Formula (M), when X is at least one linking group selected from the divalent groups in Group (A), X is preferably at least one linking group selected from the divalent groups included in the following Group (Aa); more preferably a linking group that is selected from the divalent groups included in the following Group (Aa) and has a ring structure.

Group (Aa)

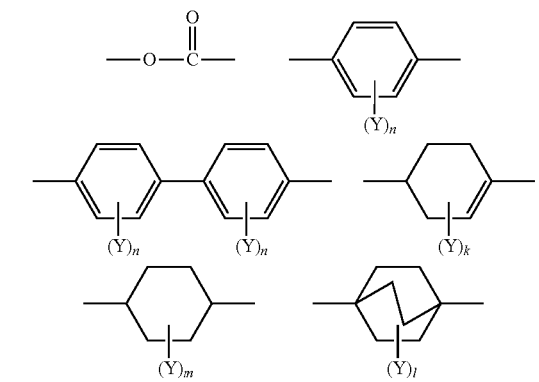

In Group (Aa), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In Group (Aa), each Y preferably independently does not exist (i.e., n, k, m or l is 0) or is an alkyl group having 1 to 3 carbon atoms, more preferably does not exist or is a methyl group, further preferably does not exist.

From the viewpoint of forming a higher-order structure in a cured product, the mesogenic structure represented by Formula (M) is preferably a mesogenic structure represented by the following Formula (M-1).

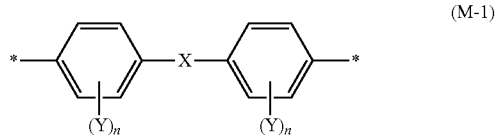

In Formula (M-1), definitions and preferred examples of X, Y, n and * are the same as the definitions and preferred examples of X, Y, n and * in Formula (M).

Preferred examples of the mesogenic structure represented by Formula (M) include a biphenyl structure or a structure in which three or more 6-membered ring groups are linearly linked, and more preferred examples include the mesogenic structures represented by the following Formulae (M-2) to (M-4). In Formulae (M-2) to (M-4), definitions and preferred examples of Y, n and * are the same as the definitions and preferred examples of Y, n and * in Formula (M).

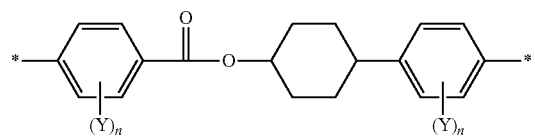
(M-2)

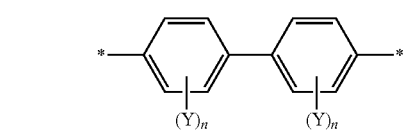
(M-3)

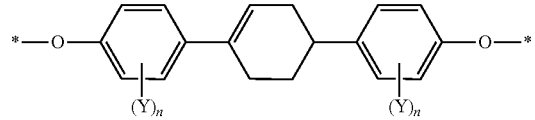
(M-4)

From the viewpoint of handleability during processing, the epoxy resin preferably includes a multimer (preferably a dimer) of a mesogen-containing epoxy compound.

In the disclosure, an epoxy compound having two or more of mesogenic groups of the same kind is referred to as a "multimer", and an epoxy compound having two mesogenic groups of the same kind is referred to as a "dimer".

A multimer of the mesogen-containing epoxy compound may be, for example, a reaction product of a mesogen-containing epoxy compound and a compound having a functional group that is capable of reacting with an epoxy group of the mesogen-containing epoxy compound (such as a hydroxy group or an amino group).

The epoxy resin may include a mesogen-containing epoxy compound that has one mesogenic structure in the molecule (hereinafter, also referred to as an epoxy monomer). Examples of the mesogen-containing epoxy compound having one mesogenic structure include an epoxy compound having a structure represented by the following Formula (1-m).

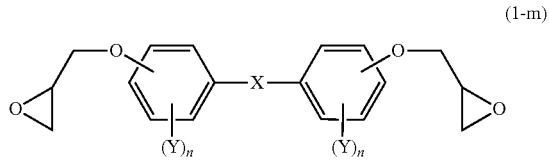
(1-m)

In Formula (1-m), definitions and preferred examples of X, Y and n are the same as the definitions and preferred examples of X, Y and n in Formula (M).

From the viewpoint of forming a higher-order structure in a cured product, the epoxy compound represented by Formula (1-m) is preferably an epoxy compound having a structure represented by the following Formula (2-m).

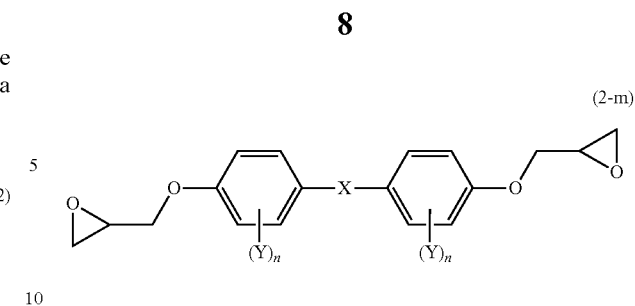
(2-m)

In Formula (2-m), definitions and preferred examples of X, Y and n are the same as the definitions and preferred examples of X, Y and n in Formula (1-m).

Preferred examples of the epoxy compound represented by Formula (1-m) include an epoxy compound having a structure represented by the following Formulae (3-m) to (5-m).

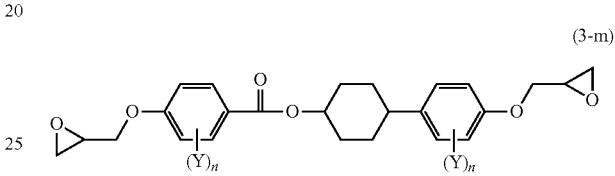
(3-m)

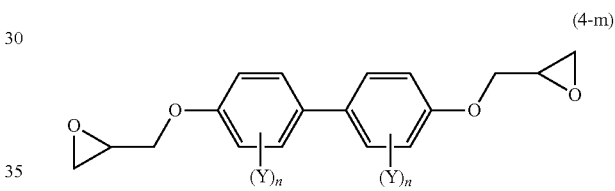
(4-m)

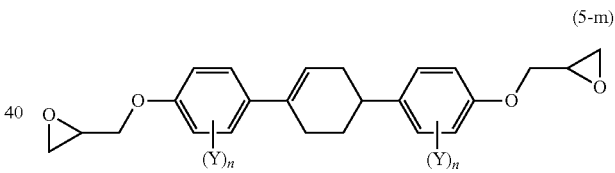
(5-m)

In Formulae (3-m) to (5-m), definitions and preferred examples of Y and n are the same as the definitions and preferred examples of Y and n in Formula (1-m).

The epoxy resin may include, as a mesogen-containing epoxy compound, both a mesogenic epoxy monomer and a multimer formed from mesogenic epoxy monomers (preferably a dimer).

In the following, exemplary embodiments of a mesogen-containing epoxy compound, which is included in the epoxy resin of the disclosure, are described. However, the epoxy resin of the disclosure is not limited to these embodiments. The details and preferred embodiments of each exemplary embodiment may be applied to other exemplary embodiment, if possible.

Specific Epoxy Compound 1

The mesogen-containing epoxy compound may be an epoxy compound represented by the following Formula (1) (hereinafter, also referred to as a specific epoxy compound 1).

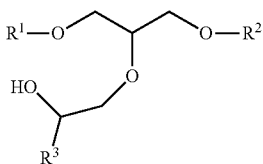 (1)

In Formula (1), each of $R^2$ and $R^3$ independently represents a monovalent group, at least one of the monovalent groups represented by $R^1$, $R^2$ and $R^3$ includes a mesogenic structure, and at least one of the monovalent groups represented by $R^1$, $R^2$ and $R^3$ has an epoxy group.

The inventors have found that an epoxy resin including a specific epoxy compound 1 has a suppressed increase in viscosity upon application of shear stress, and exhibits excellent viscosity stability. Although the reason is not necessarily clear, it is presumed that the orientation of molecules is suppressed due to the presence of a branch (portion represented by $R^3$) that partly breaks the linearity of the molecular structure of specific epoxy compound 1.

The structure of specific epoxy compound 1 is not particularly limited, as long as at least one of the monovalent groups represented by $R^1$, $R^2$ and $R^3$ includes a mesogenic structure, and at least one of the monovalent groups represented by $R^1$, $R^2$ and $R^3$ has an epoxy group.

When the monovalent group represented by $R^1$, $R^2$ or $R^3$ includes a mesogenic structure, the monovalent group may have an epoxy group or may not have an epoxy group.

When the monovalent group represented by $R^1$, $R^2$ or $R^3$ includes a mesogenic structure, the monovalent group may consist only of a mesogenic structure or may be combined with a different structure.

When the monovalent group represented by $R^1$, $R^2$ or $R^3$ has an epoxy group, the position of the epoxy group in the monovalent group is not particularly limited. For example, the monovalent group may have an epoxy group at a terminal thereof. The monovalent group may have only one epoxy group or may have two or more epoxy groups.

The number of the mesogenic structure in the molecule of specific epoxy compound 1 may be only one or more than one. When specific epoxy compound 1 has two or more mesogenic structures in the molecule, the mesogenic structures may be the same or different from each other.

When the monovalent group represented by $R^1$, $R^2$ or $R^3$ does not include a mesogenic structure, examples of the monovalent group include an aliphatic hydrocarbon group, an aliphatic hydrocarbon-oxy group, an aromatic hydrocarbon group, and an aromatic hydrocarbon-oxy group. Examples of the aliphatic hydrocarbon group include an alkyl group and an alkenyl group, and examples of the aromatic hydrocarbon group include a phenyl group and a naphthyl group.

When the monovalent group represented by $R^1$, $R^2$ or $R^3$ does not include a mesogenic structure, the carbon number of the monovalent group is not particularly limited. For example, the carbon number may be 20 or less, or may be 15 or less. The monovalent group represented by $R^1$, $R^2$ or $R^3$ may be unsubstituted or may have a substituent.

In an embodiment, specific epoxy compound 1 may have a mesogenic structure in the monovalent groups represented by $R^1$ and $R^2$, or may have a mesogenic structure in the monovalent groups represented by $R^1$, $R^2$ and $R^3$.

In an embodiment, specific epoxy compound 1 may have an epoxy group at a terminal of at least one of the monovalent groups represented by $R^1$ and $R^2$, or may have an epoxy group at a terminal of each of the monovalent groups represented by $R^1$, $R^2$ and $R^3$.

Whether or not an epoxy resin includes specific epoxy compound 1 can be determined by existence or non-existence of a peak derived from specific epoxy compound 1 in a chart obtained by gel permeation chromatography (GPC), for example.

The content of specific epoxy compound 1 in the epoxy resin is not particularly limited. For example, specific epoxy compound 1 may be included in an amount such that the proportion of the area of a peak derived from specific epoxy compound 1, with respect to the total area of peaks derived from epoxy compounds having a main chain including two or more mesogenic structures, is 3% or more. From the viewpoint of viscosity stability upon application of shear stress, the proportion is preferably 4% or more, more preferably 5% or more.

The upper limit of the content of specific epoxy compound 1 is not particularly limited. From the viewpoint of suppressing an increase in viscosity or epoxy group density (epoxy equivalent amount), the proportion is preferably 25% or less.

In a chart obtained by GPC, the total area A of peaks, derived from epoxy compounds having a main chain including two or more mesogenic structures, can be calculated from a chart obtained by detecting the absorbance at 280 nm of the epoxy resin for measurement, by subtracting an area of a peak derived from an epoxy compound having only one mesogenic structure (mesogenic epoxy monomer) from the total area of all peaks, for example. The measurement conditions for the GPC are not particularly limited as long as desired results are obtained. For example, the measurement can be performed under the conditions described in the Examples described later.

Examples of the "main chain including two or more mesogenic structures" of an epoxy compound include a structure in which two or more mesogenic structures are bonded via a divalent linking group, such as an arylene group. Examples of the "branch" of an epoxy compound include a structure formed by reaction between a functional group such as a secondary hydroxy group, existing at a bonding site of structural units of the main chain, and a different compound. The branch of an epoxy compound may include a mesogenic structure, or may not include a mesogenic structure. The branch of an epoxy compound may have an epoxy group, or may not have an epoxy group.

The excellent viscosity stability upon application of shear stress of an epoxy resin including specific epoxy compound 1 can be achieved by including an epoxy compound having at least one branch in the molecule in a certain amount. As a matter of convenience, the content of specific epoxy compound 1 can be estimated based on the proportion of the area of a peak derived from an epoxy compound having a specific structure (such as an epoxy compound having a main chain including two mesogenic structures and one branch).

Specific Epoxy Compound 2

The mesogen-containing epoxy compound may be a combination of epoxy compound A, having at least two mesogenic structures and at least one phenylene group, and epoxy compound B, having at least two mesogenic structures and at least one divalent biphenyl group (hereinafter, also referred to as specific epoxy compound 2).

In the embodiment, when the at least two mesogenic structures of epoxy compound A includes a phenylene group, the phenylene group is regarded as a different component from the "at least one phenylene group". When the at least two mesogenic structures of epoxy compound B includes a divalent biphenyl group, the divalent biphenyl group is regarded as a different component from the "at least one divalent biphenyl group".

The epoxy resin may include only one kind of epoxy compound A or two or more kinds thereof, or may include only one kind of epoxy compound B or two or more kinds thereof. The mesogenic structures of epoxy compound A or epoxy compound B may be the same or different from each other.

The inventors have found that the epoxy resin, including both epoxy compound A and epoxy compound B, exhibits a lower degree of increase in viscosity upon application of shear stress and exhibits a favorable viscosity stability, as compared with an epoxy resin that includes epoxy compound B alone. The reason is considered that combination of epoxy compound A with epoxy compound B, which is more likely to be oriented by physical stimulation such as application of shear stress, contribute to the suppressed increase viscosity upon application of shear stress.

The ratio of epoxy compound A and epoxy compound B based on mass in the epoxy resin is not particularly limited. From the viewpoint of achieving both the lowered viscosity at a temperature for processing and the stable viscosity upon continuous application of shear stress, the ratio of epoxy compound A and epoxy compound B (epoxy compound A: epoxy compound B) is preferably from 1:9 to 9:1, more preferably from 3:7 to 9:1, further preferably from 4:6 to 8:2, yet further preferably from 6:4 to 8:2.

The structures of epoxy compound A and epoxy compound B are not particularly limited as long as the compounds have at least two mesogenic structures and at least one of phenylene group or divalent biphenyl group. The two or more mesogenic structures in a molecule of epoxy compound A or epoxy compound B may be the same or different from each other.

Examples of the phenylene group of epoxy compound A include a structure represented by the following Formula (5A). Examples of the divalent biphenyl group of epoxy compound B include a structure represented by the following Formula (5B).

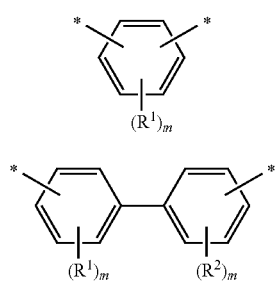

(5A)

(5B)

In Formula (5A) and Formula (5B), * represents a bonding site to an adjacent atom. Examples of the adjacent atom include an oxygen atom and a nitrogen atom. Each of $R^1$ and $R^2$ independently represents a monovalent substituent. Each m independently is an integer from 0 to 4.

Examples of the monovalent substituent represented by $R^1$ or $R^2$ include a monovalent hydrocarbon group and a halogen atom. Examples of the monovalent hydrocarbon group include an alkyl group, preferably an alkyl group having 1 to 8 carbon atoms, more preferably an alkyl group having 1 to 3 carbon atoms, further preferably a methyl group. Examples of the halogen atom include a fluorine atom, a chlorine atom and a bromine atom, preferably a fluorine atom.

Each m independently preferably an integer from 0 to 2, more preferably 0 or 1, further preferably 0.

Among the structures represented by Formula (5A), a structure represented by the following Formula (5a) is preferred, and among the structures represented by Formula (5B), a structure represented by the following Formula (5b) is preferred. An epoxy compound having a structure represented by Formula (5a) or Formula (5b) tends to have a linear molecular structure, and therefore, it is considered to have a high degree of molecular stacking property and easier to form a higher-order structure.

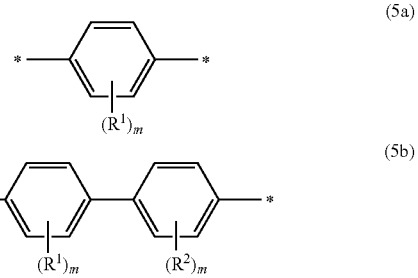

(5a)

(5b)

In Formulae (5a) and (5b), definitions and preferred examples of *, $R^1$, $R^2$ and m are the same as the definitions and preferred examples of *, $R^1$, $R^2$ and m in Formulae (5A) and (5B).

Epoxy compound A and epoxy compound B preferably have a structure in which one phenylene group or one divalent biphenyl group is positioned between two mesogenic structures.

Epoxy compound A and epoxy compound B may be an epoxy compound having a structure represented by the following Formula (6-1) or Formula (6-2).

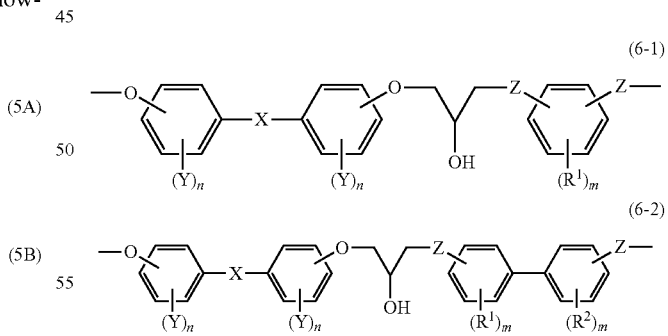

(6-1)

(6-2)

In Formulae (6-1) and (6-2), definitions and preferred examples of X, Y and n are the same as the definitions and preferred examples of X, Y and n in Formula (M). Definitions and preferred examples of $R^1$, $R^2$ and m are the same as the definitions and preferred examples of $R^1$, $R^2$ and m in Formulae (5A) and (5B). Each Z independently represents —O— or —NH—.

The number of mesogenic structures of epoxy compound A and epoxy compound B is not particularly limited as long as it is two or more. From the viewpoint of lowered viscosity during processing, at least a part of epoxy compound A or epoxy compound B is preferably a compound having two mesogenic structures (dimer).

Examples of epoxy compound A or epoxy compound B in the form of a dimer include a compound represented by the following Formula (7-1) or Formula (7-2).

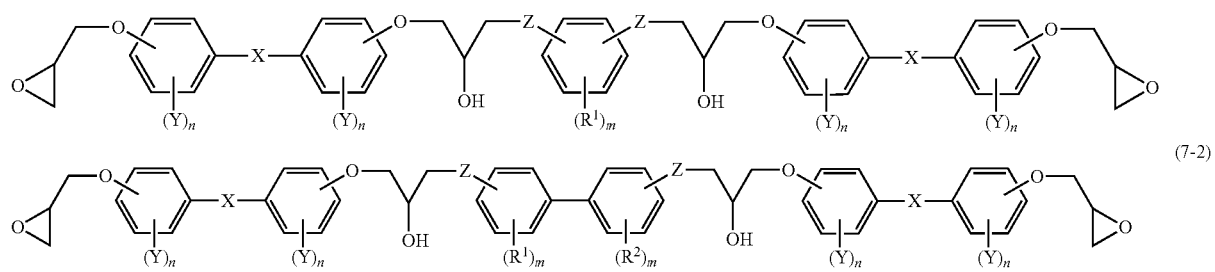

(7-1)

(7-2)

In Formulae (7-1) and (7-2), definitions and preferred examples of X, Y, n, m, $R^1$, $R^2$ and Z are the same as the definitions and preferred examples of X, Y, n, m, $R^1$, $R^2$ and Z in Formulae (6-1) and (6-2).

Specific Epoxy Compound 3

The mesogen-containing epoxy compound may be an epoxy compound having two aromatic rings that form a divalent biphenyl structure, and having mesogenic structures that are independently bonded to each of the two aromatic rings, wherein at least one of the mesogenic structures is bonded to the aromatic ring at an angle to the molecular axis of the biphenyl structure (hereinafter, also referred to as specific epoxy compound 3).

The inventors have found that an epoxy resin including specific epoxy compound 3 has a suppressed increase in viscosity upon application of shear stress, and exhibits excellent viscosity stability. Although the reason is not necessarily clear, it is presumed that the epoxy compound has a skewed molecular structure due to at least one of mesogenic structures being bonded to the aromatic ring at an angle to the molecular axis of the biphenyl structure.

In the disclosure, the "molecular axis of the biphenyl structure" refers to a line that connects a carbon atom, that contributes to the bonding of the aromatic rings of the biphenyl structure, to a carbon atom that is at para position with respect to the carbon atom.

In the disclosure, the state "at least one of the mesogenic structures is bonded to the aromatic ring at an angle to the molecular axis of the biphenyl structure" refers to a state that the bonding site of at least one mesogenic structure to an aromatic ring is not on the molecular axis of the biphenyl structure, i.e., a state in which the bonding of at least one mesogenic structure to an aromatic ring is at ortho or meta position with respect to the carbon atom that contributes to bonding of the aromatic rings of the biphenyl structure.

Accordingly, an epoxy compound having two aromatic rings that form a divalent biphenyl structure, and having mesogenic structures that are independently bonded to each of the two aromatic rings, wherein at least one of the mesogenic structures is bonded to the aromatic ring at ortho or meta position with respect to the carbon atom that contributes to bonding of the aromatic rings of the biphenyl structure, is also included in specific epoxy compound 3.

The state of bonding of the mesogenic structure to the aromatic rings that form a divalent biphenyl structure is not particularly limited. For example, the mesogenc structure may be directly bonded to the aromatic ring or may be bonded via a linking group. The mesogenic structure may include a biphenyl structure. In that case, a biphenyl structure included in a mesogenic structure is regarded as a different component from the divalent biphenyl structure.

Specific examples of the divalent biphenyl structure included in specific epoxy compound 3 include a structure represented by the following Formulae (BP1) to (BP5). The steric positional relationship between the two aromatic rings that form a divalent biphenyl structure is not particularly limited. For example, the plane formed of each aromatic ring may be on the same plane or on different planes.

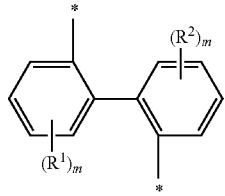

(BP1)

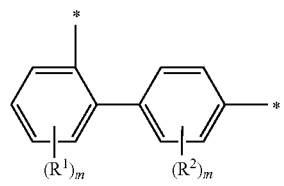

(BP2)

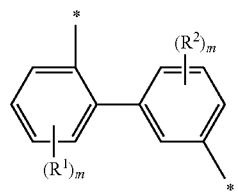

(BP3)

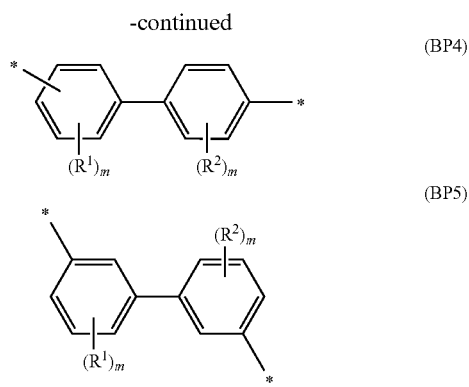

(BP4)

(BP5)

In Formulae (BP1) to (BP5), * represents a bonding site with respect to an adjacent atom. Each of $R^1$ and $R^2$ independently represents a monovalent substituent. Each m independently is an integer from 0 to 4.

Examples of the monovalent substituent represented by $R^1$ and $R^2$ include a monovalent hydrocarbon group and a halogen atom. Examples of the monovalent hydrocarbon group include an alkyl group, preferably an alkyl group having 1 to 8 carbon atoms, more preferably an alkyl group having 1 to 3 carbon atoms, further preferably a methyl group. Examples of the halogen atom include a fluorine atom, a chlorine atom and a bromine atom, preferably a fluorine atom.

Each m independently preferably is an integer from 0 to 2, more preferably 0 or 1, further preferably 0.

From the viewpoint of forming a skewed structure of specific epoxy compound 3, the structure represented by Formulae (BP1) to (BP5) is preferably a structure represented by Formula (BP1), (BP3) or (BP5), in which both bonding sites represented by * are at ortho or meta position with respect to the carbon atom that contributes to bonding of the aromatic rings of the biphenyl structure.

From the viewpoint of forming a skewed structure of specific epoxy compound 3, the structure represented by Formulae (BP1) to (BP5) is preferably a structure represented by Formula (BP1), (BP2) or (BP3), in which at least one of bonding sites represented by * is at ortho position with respect to the carbon atom that contributes to bonding of the aromatic rings of the biphenyl structure; more preferably a structure represented by Formula (BP1), in which both of bonding sites represented by * are at ortho position with respect to the carbon atom that contributes to bonding of the aromatic rings of the biphenyl structure.

Specific epoxy compound 3 may be a compound having a structure represented by Formula (6-2) in which at least one of Z is bonded to the aromatic ring that forms the divalent biphenyl structure at an angle of the molecular axis of the divalent biphenyl structure, i.e., at least one of Z is bonded to the aromatic ring at ortho or meta position with respect to the carbon atom that contributes to bonding of the aromatic rings of the biphenyl structure.

From the viewpoint of imparting a skewed structure to specific epoxy compound 3, specific epoxy compound 3 is preferably a compound having a structure represented by Formula (6-2), in which both of Z are bonded to the aromatic ring that forms the divalent biphenyl structure at an angle of the molecular axis of the divalent biphenyl structure, i.e., both of Z are bonded to the aromatic ring at ortho or meta position with respect to the carbon atom that contributes to bonding of the aromatic rings of the biphenyl structure.

From the viewpoint of forming a skewed structure of specific epoxy compound 3, specific epoxy compound 3 is preferably a compound having a structure represented by the Formula (6-2), in which both of Z are bonded the aromatic ring at ortho position with respect to the carbon atom that contributes to bonding of the aromatic rings of the biphenyl structure, i.e., a compound having a structure represented by the following Formula (8).

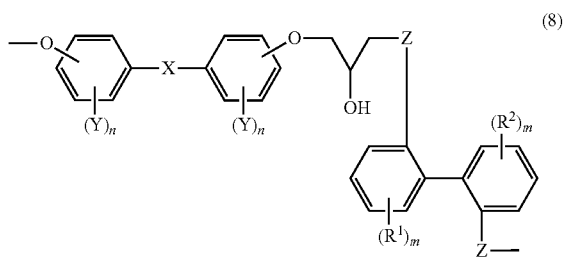

(8)

In Formula (8), definitions and preferred examples of X, Y, n, $R^1$, $R^2$, m and Z are the same as the definitions and preferred examples of X, Y, n, $R^1$, $R^2$, m and Z in Formula (6-2).

The number of mesogenic structures in specific epoxy compound 3 is not particularly limited as long as it is two or more. From the viewpoint of lowering the viscosity of the epoxy resin, at least a part of specific epoxy compound 3 is preferably a compound having two mesogenic structures (dimer).

Examples of the structure of specific epoxy compound 3 as a dimer include a structure represented by Formula (7-2) in which at least one of Z is bonded to the aromatic ring that forms the divalent biphenyl structure at an angle of the molecular axis of the divalent biphenyl structure, i.e., at least one of Z is bonded to the aromatic ring at ortho or meta position with respect to the carbon atom that contributes to bonding of the aromatic rings of the biphenyl structure.

From the viewpoint of forming a skewed structure to specific epoxy compound 3, specific epoxy compound 3 is preferably a compound having a structure represented by Formula (7-2) in which at least one of Z is bonded to the aromatic ring at ortho position with respect to the carbon atom that contributes to bonding of the aromatic rings of the biphenyl structure; more preferably a compound having a structure represented by Formula (7-2) in which both of Z are bonded to the aromatic ring at ortho position with respect to the carbon atom that contributes to bonding of the aromatic rings of the biphenyl structure, i.e., a compound having a structure represented by the following Formula (9).

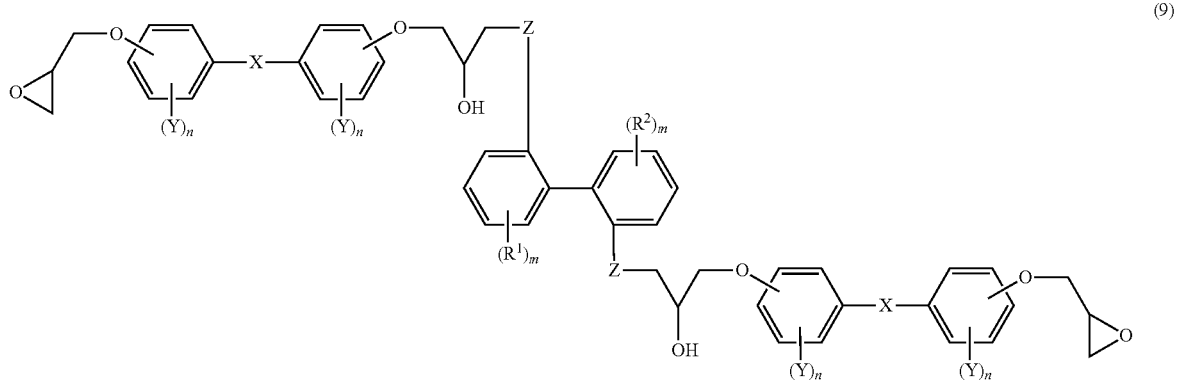

(9)

In Formula (9), definitions and preferred examples of X, Y, n, m, $R^1$, $R^2$ and Z are the same as the definitions and preferred examples of X, Y, n, m, $R^1$, $R^2$ and Z in Formula (7-2).

Epoxy Resin (Second Embodiment)

The epoxy resin of the second embodiment includes an epoxy compound represented by the following Formula (1). Specifically, the epoxy resin of the second embodiment includes specific epoxy compound 1 as described above, as a mesogen-containing epoxy compound.

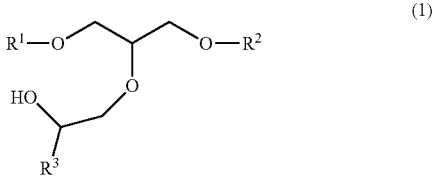

(1)

In Formula (1), each of $R^1$, $R^2$ and $R^3$ independently represents a monovalent group, at least one of the monovalent groups represented by $R^1$, $R^2$ and $R^3$ includes a mesogenic structure, and at least one of the monovalent groups represented by $R^1$, $R^2$ and $R^3$ has an epoxy group.

The epoxy resin as specified above has a suppressed increase in viscosity upon application of shear stress, and exhibits excellent viscosity stability. Although the reason is not necessarily clear, it is presumed that the orientation of molecules is suppressed by irregular portions in the linear molecular structure due to the presence of a branch.

The details and preferred embodiments of an epoxy compound represented by Formula (1) are the same as the details and preferred embodiments of specific epoxy compound 1.

The content of an epoxy compound represented by Formula (1) in the epoxy resin is not particularly limited. For example, the epoxy compound represented by Formula (1) may be included in an amount such that the proportion of the area of a peak derived from the epoxy compound, with respect to the total area of peaks derived from epoxy compounds having a main chain including two or more mesogenic structures, is 3% or more.

Epoxy Resin (Third Embodiment)

The epoxy resin of the third embodiment is an epoxy resin including an epoxy compound, the epoxy compound having a main chain comprising two mesogenic structures and one branch, and having a ratio of area B to area A of 3% or more, wherein the area A is a total area of peaks derived from epoxy compounds having a main chain including two or more mesogenic structures, and the area B is an area of a peak derived from the epoxy compound, as shown in a chart obtained by gel permeation chromatography (GPC).

The ratio of area B with respect to area A is not particularly limited, as long as it is 3% or more. From the viewpoint of viscosity stability upon application of shear stress, the ratio is preferably 4% or more, more preferably 5% or more.

The upper limit of the ratio of area B with respect to area A is not particularly limited. From the viewpoint of suppressing an increase in viscosity and from the viewpoint of epoxy group density (epoxy equivalent amount), the ratio is preferably 25% or less.

The epoxy resin as specified above has a suppressed increase in viscosity upon application of shear stress, and exhibits excellent viscosity stability. Therefore, the epoxy resin exhibits excellent processing compatibility. Although the reason is not necessarily clear, it is presumed that the orientation of molecules is suppressed due to the presence of a branch that causes irregularity in the linearity of the molecular structure of the epoxy compound.

In a chart obtained by GPC, the total area A of peaks derived from epoxy compounds having a main chain including two or more mesogenic structures can be calculated by, for example, subtracting an area of a peak derived from an epoxy compound having only one mesogenic structure from the total area of all peaks shown in a chart obtained by detecting the absorbance at 280 nm of the epoxy resin for measurement. The measurement conditions for the GPC are not particularly limited as long as desired results are obtained. For example, the measurement can be performed under the conditions described in the Examples.

Examples of the "main chain including two or more mesogenic structures" of an epoxy compound include a structure in which two or more mesogenic structures are bonded via a divalent linking group, such as an arylene group. Examples of the "branch" of an epoxy compound include a structure formed by reaction between a functional group such as a secondary hydroxy group, which exists at a bonding site of structural units of the main chain, and a different compound. The branch of an epoxy compound may include a mesogenic structure, or may not include a mesogenic structure. The branch of an epoxy compound may have an epoxy group, or may not have an epoxy group.

The excellent viscosity stability upon application of shear stress of the epoxy resin of the embodiment can be achieved by including an epoxy compound having at least one branch in the molecule in a certain amount. As a matter of convenience, the content of an epoxy compound having a branch can be estimated based on the proportion of epoxy compound having a main chain including two mesogenic structures and one branch.

The details and preferred embodiments of the epoxy resin and the epoxy compound may be the same as the details and preferred embodiments of the epoxy resin of the first embodiment or the second embodiment, and the details and preferred embodiments of the epoxy compound included therein.

The epoxy resin of the embodiment may include, as a mesogen-containing epoxy compound, an epoxy compound having a structure represented by Formula (1), i.e., specific epoxy compound 1.

Method of Synthesizing Mesogen-Containing Epoxy Compound

The method of synthesizing a mesogen-containing epoxy compound is not particularly limited. For example, a mesogen-containing epoxy compound may be obtained by allowing an epoxy compound, having a mesogenic structure of a mesogen-containing epoxy compound (mesogenic epoxy monomer) to react with a compound having a functional group that can react with an epoxy group of the mesogenic epoxy monomer. Examples of the mesogenic epoxy monomer include an epoxy compound having a structure represented by Formula (1-m).

The method of reacting a mesogenic epoxy monomer and a compound having a functional group that can react with an epoxy group of the mesogenic epoxy monomer is not specifically limited. Specifically, for example, the reaction can be performed by dissolving a mesogenic epoxy monomer and a compound having a functional group that is capable of reacting with an epoxy group of the mesogenic epoxy monomer, and optionally a reaction catalyst, in a solvent, and stirring the same while heating.

Alternatively, for example, a mesogen-containing epoxy compound may be synthesized by mixing a mesogenic epoxy monomer and a compound having a functional group that can react with an epoxy group of the mesogenic epoxy monomer, without using a solvent, and stirring the mixture while heating.

In a case of synthesizing specific epoxy compound 1, as a mesogen-containing epoxy compound, the method of introducing a structure represented by $R^3$ in Formula (1) (branch) is not particularly limited. For example, the introduction can be performed by allowing an epoxy group of a mesogenic epoxy monomer having a structure represented by $R^3$ to react with a secondary hydroxy group, which is formed as a result of reaction between a mesogenic epoxy monomer having a structure corresponding to $R^1$ and $R^2$ and a compound having a hydroxy group as a functional group to react with an epoxy group.

The progression of reaction for introducing a structure represented by $R^3$ into a reaction product can be controlled by, for example, selecting a suitable reaction catalyst.

Specifically, when a reaction catalyst having a relatively lower activity is used, progression of the reaction between a secondary hydroxy group and an epoxy group of a mesogenic epoxy monomer having a structure of $R^3$ tends to be suppressed, whereas the reaction between an epoxy resin of a mesogenic epoxy monomer having a structure of $R^1$ and $R^2$ and a hydroxy group is promoted. As a result, the ratio of epoxy compound having a structure of $R^3$ tends to be lowered.

Contrary to the above, when a reaction catalyst having a relatively high activity is used, progression of reaction between a secondary hydroxy group and an epoxy group of a mesogenic epoxy monomer having a structure of $R^3$ tends to be promoted as well as the reaction between an epoxy resin of a mesogenic epoxy monomer having a structure of $R^1$ and $R^2$ and a hydroxy group. As a result, introduction of a structure of $R^3$ is efficiently promoted.

The solvent used for the synthesis is not particularly limited, as long as it can dissolve a mesogenic epoxy monomer and a compound having a functional group that is capable of reacting with an epoxy group of the mesogenic epoxy monomer, and can be heated to a temperature required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve, and propyleneglycol monopropyl ether.

The amount of the solvent is not particularly limited, as long as a mesogenic epoxy monomer and a compound having a functional group that is capable of reacting with an epoxy group of the mesogenic epoxy monomer, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The compound having a functional group that is capable of reacting with an epoxy group of the mesogenic epoxy monomer is not particularly limited. From the viewpoint of thermal resistance of a cured product, a compound having at least one benzene ring (aromatic compound) is preferred. From the viewpoint of forming a smectic structure in a cured product, the aromatic compound is preferably at least one selected from the group consisting of a dihydroxybenzene compound, having a structure in which two hydroxy groups are bonded to a benzene ring; a diaminobenzene compound, having a structure in which two amino groups are bonded to a benzene ring; a dihydroxybiphenyl compound, having a structure in which two hydroxy groups are bonded to each of the benzene rings that form a biphenyl structure, respectively; and a diaminobiphenyl compound, having a structure in which two amino groups are bonded to each of the benzene rings that form a biphenyl structure, respectively (hereinafter, also referred to as specific aromatic compounds).

Examples of the dihydroxy compound include catechol, resorcinol, hydroquinone and derivatives thereof.

Examples of the diaminobenzene compound include 1,2-diaminobenzene, 1,3-diaminobenzene, 1,4-diaminobenzene and derivative thereof.

Examples of the dihydroxybiphenyl compound include 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl and derivatives thereof.

Examples of the diaminobiphenyl compound include 2,2'-diaminobiphenyl, 2,3'-diaminoibiphenyl, 2,4'-diaminobiphenyl, 3,3'-diaminobiphenyl, 3,4'-diaminobiphenyl, 4,4'-diaminobiphenyl and derivatives thereof.

Derivatives of the specific aromatic compound include a specific aromatic compound having a substitute, such as an alkyl group of from 1 to 8 carbon atoms, on the benzene ring.

A single kind of the specific aromatic compound may be used alone, or two or more kinds may be used in combination.

The type of the reaction catalyst is not particularly limited, and may be selected based on the reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of thermal resistance of a cured product, the reaction catalyst is preferably an organic phosphorous compound.

Preferred examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine such as tributylphosphine, dialkylarylphosphine, and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, phenyl-1,4-benzoquinone, and hydroquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the mesogenic epoxy monomer and the compound having a functional group that is capable of reacting with an epoxy group of the mesogenic epoxy monomer.

In a case of synthesizing a mesogen-containing epoxy compound by using a mesogenic epoxy monomer, the total of the mesogenic epoxy monomer may react to form a mesogenic epoxy compound, or the mesogenic epoxy monomer may partly remain in an unreacted state. From the viewpoint of thermal resistance as described later, the mesogenic epoxy monomer preferably partly remains in an unreacted state.

The mesogen-containing epoxy compound can be synthesized by using a reaction container, such as a flask in a small scale or a reaction cauldron in a large scale. A specific example of the synthesis method is described below.

A mesogenic epoxy monomer is placed in a reaction container and a solvent is added as necessary, and the epoxy monomer is dissolved by heating the reaction container to a reaction temperature with an oil bath or a heating medium. Then, a compound having a functional group that is capable of reacting with an epoxy group of the mesogenic epoxy monomer is added thereto. After dissolving the compound in the solvent, a reaction catalyst is added as necessary, thereby starting the reaction. Subsequently, the solvent is removed under reduced pressure as necessary, whereby a mesogenic epoxy compound is obtained.

The reaction temperature is not particularly limited, as long as the reaction of a mesogenic epoxy group and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the mesogenic epoxy monomer to the compound having a functional group that is capable of reacting with an epoxy group of the mesogenic epoxy monomer, used for the synthesis, is not particularly limited. For example, the ratio may be adjusted to satisfy a ratio of the number of equivalent of epoxy group (A) to the number of equivalent of the functional group that is capable of reacting with an epoxy group (B), represented by A:B, of from 10:0.01 to 10:10. From the viewpoint of fracture toughness and heat resistance of a cured product, the range of A:B is preferably from 10:0.1 to 10:5.

From the viewpoint of handleability of an epoxy resin, the range of A:B is preferably from 10:1.6 to 10:3.0, more preferably from 10:1.8 to 10:2.9, further preferably from 10:2.0 to 10:2.8.

The structure of the specific epoxy compound can be determined by, for example, matching a molecular weight of the specific epoxy compound, which is presumed to be obtained by the reaction of the mesogenic epoxy monomer and the compound having a functional group that is capable of reacting with an epoxy group of the mesogenic epoxy monomer, with a molecular weight of a target compound obtained by liquid chromatography that is performed by a liquid chromatograph having a UV spectrum detector and a mass spectrum detector.

The liquid chromatography is performed by a gradient method using a column for analysis (for example, LaChrom II C16 from Hitachi, Ltd.) while continuously changing the mixture ratio (by volume) of the eluent in the order of acetonitrile/tetrahydrofuran/10 mmol/1 aqueous ammonium acetate solution=20/5/75, acetonitrile/tetrahydrofuran=80/20 (20 min from the start) and acetonitrile/tetrahydrofuran=50/50 (35 min from the start) at a flow rate of 1.0 ml/min. The UV spectrum detector detects an absorbance at a wavelength of 280 nm and the mass spectrum detector detects an ionization voltage as 2700 V.

The weight-average molecular weight (Mw) of the epoxy resin is not particularly limited. From the viewpoint of lowering the viscosity, the weight-average molecular weight (Mw) of the epoxy resin is preferably within a range of from 800 to 1300.

In the disclosure, the number-average molecular weight (Mn) and the weight-average molecular weight (Mw) of the epoxy resin is measured by liquid chromatography.

The liquid chromatography is performed at a sample concentration of 0.5% by mass and a flow rate of 1.0 ml/min, using tetrahydrofuran as a mobile phase. A calibration curve is obtained by using a polystyrene standard sample, and the Mn and Mw (polystyrene-based) are calculated.

The measurement can be performed by using a high performance liquid chromatograph (for example, L6000 from Hitachi, Ltd.) and a data analyzer (for example, C-R4A from Shimadzu Corporation) with GPC columns (for example, G2000HXL and G3000 HXL from Tosoh Corporation).

The epoxy equivalent amount of the epoxy resin is not particularly limited. From the viewpoint of achieving both fluidity of the epoxy resin and thermal conductivity of a cured product thereof, the epoxy equivalent amount is preferably from 245 g/eq to 360 g/eq, more preferably from 250 g/eq to 355 g/eq, further preferably from 260 g/eq to 350 g/eq.

When the epoxy equivalent amount of the epoxy resin is 245 g/eq or more, crystallinity of the epoxy resin is not too high and the fluidity is less likely to be lowered. When the epoxy equivalent amount of the epoxy resin is 360 g/eq or less, the crosslinking density of the epoxy resin is not too low and a high degree of thermal conductivity of a formed product tends to be achieved. In the disclosure, the epoxy equivalent amount of the epoxy resin is measured by perchloric acid titration.

Epoxy Resin Composition (First Embodiment)

The epoxy resin composition of the first embodiment includes an epoxy resin as described above and a curing agent.

The epoxy resin composition of the embodiment exhibits excellent processing compatibility.

Epoxy Resin Composition (Second Embodiment)

The epoxy resin composition of the second embodiment includes an epoxy resin having a mesogenic structure and a curing agent, and having a value of $\eta'4/\eta'3$ equal to 3 or less, wherein $\eta'3$ is an initial dynamic shear viscosity (Pa·s) and $\eta'4$ is a maximum value of dynamic shear viscosity (Pa·s), in a measurement of dynamic shear viscosity.

The epoxy resin composition of the embodiment has a suppressed increase in viscosity upon application of shear stress, even if the epoxy resin includes an epoxy compound having a mesogenic structure, and exhibits excellent processing compatibility.

The dynamic shear viscosity of an epoxy resin composition can be measured with a rheometer. Specifically, the dynamic shear viscosity is measured with a gap between a parallel plate and a stage of a rheometer of 0.2 mm, a frequency of 1 Hz, a strain of 1000%, and a temperature of 80° C. (constant), over 120 minutes in a continuous manner. As the rheometer, MCR-301 from Anton-Paar GmbH may be used, for example.

The value of if $\eta40$ $4/\eta'3$ is not specifically limited as long as it is 3 or less. The smaller the value is, the epoxy resin composition is more stable in viscosity upon application of shear stress, and exhibits excellent processing compatibility. The value of $\eta'4/\eta'3$ is preferably 2.5 or less, more preferably 2 or less.

The absolute value of the dynamic shear stress obtained by the measurement is not specifically limited. From the viewpoint of fluidity of the epoxy resin, the initial dynamic viscosity $\eta'3$ is preferably 500 Pa·s or less, more preferably 300 Pa·s or less, further preferably 100 Pa·s or less.

The epoxy resin included in the epoxy resin composition of the embodiment is not particularly limited, as long as an epoxy compound having a mesogenic structure is included therein. For example, the epoxy resin may include a mesogen-containing epoxy compound as described above.

The type of the curing agent included in the epoxy resin composition of the embodiments is not particularly limited.

Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of thermal conductivity and toughness of a cured product, the epoxy resin composition is preferably capable of forming a higher-order structure, more preferably a smectic structure, in a cured product thereof. From the viewpoint of forming a higher-order structure in a cured product, a curing agent is preferably an amine curing agent or a phenol curing agent, more preferably an amine curing agent.

The curing agent may be selected from those that are commonly used, and may be selected from commercial products.

From the viewpoint of thermal resistance, the curing agent is preferably an amine curing agent having a benzene ring or a naphthalene ring, more preferably an amine curing agent having an amino group on a benzene ring or a naphthalene ring. From the viewpoint of curability, the curing agent is preferably a polyfunctional amine curing agent having two or more amino groups.

Specific examples of the amine curing agent include 3,3'-diaminodiphenylsulfone, 4,4'-diaminodiphenylsulfone, 4,4'-diaminodiphenylmethane, 3,3'-diethyl-4,4'-diaminodiphenylmethane, 4,4'-diaminodiphenylether, 4,4'-diamino-3, 3'-dimethoxybiphenyl, 4,4'-diaminophenylbenzoate, 1,5-diaminonaphthalene, 1,3-diaminonaphthalene, 1,2-phenylenediamine, 1,3-phenylenediamine, 1,4-phenylenediamine, 4,4'-diaminobenzanilide, 3,3'-diaminobenzanilide, trimethylene-bis-4-aminobenzoate, 1,4-diaminonaphthalene and 1,8-diaminonaphthalene.

Examples of the phenol curing agent include a low-molecular phenol compound and a phenol novolac resin, which is obtained by linking low-molecular phenol compound with a methylene group or the like. Examples of the low-molecular phenol compound include a monofunctional phenol compound, such as phenol, o-cresol, m-cresol and p-cresol; a difunctional phenol compound, such as catechol, resorcinol and hydroquinone; and a trifunctional phenol compound such as 1,2,3-trihydroxybenzene, 1,2,4-trihydroxybenzen and 1,3,5-trihydroxybenzene.

The amount of the curing agent in the epoxy resin composition is not particularly limited. From the viewpoint of efficiency of curing reaction, the amount of the curing agent preferably satisfies a ratio of equivalent amount A of the functional group (active hydrogen in a case of amine curing agent) of the curing agent in the epoxy resin composition with respect to equivalent amount B of the epoxy group of the epoxy resin (A/B) of from 0.3 to 3.0, more preferably from 0.5 to 2.0.

Other Components

The epoxy resin composition may include components other than the epoxy resin and the curing agent. For example, the epoxy resin composition may include a curing catalyst, a filler or the like. Specific examples of the curing catalyst include the compounds as described above as a reaction catalyst used for the synthesis of the specific epoxy compound.

Use Application

The use application of the epoxy resin composition is not particularly limited. Since the epoxy resin composition has a suppressed increase in viscosity upon application of shear stress, it is suitable used for a method that requires excellent fluidity during processing. For example, the epoxy resin composition may be used for a process of producing FRPs (Fiber-Reinforced Plastics), in which fibers are impregnated with an epoxy resin composition while heating, or a process of producing a sheet-like product in which an epoxy resin composition is spread with a squeegee or the like while heating.

Epoxy Resin Composition and Composite Material

The epoxy resin cured product of the disclosure is obtained by curing the epoxy resin composition of the embodiment as described above. The composite material of the disclosure includes the epoxy resin cured product of the embodiment and a reinforcing material.

Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone, or may include two or more kinds in combination.

EXAMPLES

In the following, the invention is explained by referring to the Examples. However, the invention is not limited to these Examples. The "part" and "%" are based on mass, unless otherwise specified.

Synthesis of Epoxy Resin

Example 1

An epoxy resin including specific epoxy compound 1 as a mesogen-containing epoxy compound was synthesized by the following method.

To a 500-mL three-necked flask, 50 parts by mass of (4-{4-(2,3-epoxypropoxy)phenyl}cyclohexyl=4-(2,3-epoxypropoxy)benzoate (following structure, epoxy equivalent amount: 227 g/eq) were placed as the mesogenic epoxy monomer, and 80 parts by mass of a solvent (cyclohexanone) were added. A cooling tube and a nitrogen inlet tube were attached to the flask, and a stirring blade was attached so as to be immersed in the solvent. Then, the flask was immersed in an oil bath at 160° C. and subjected to stirring.

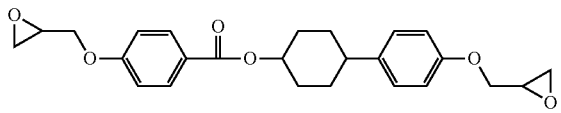 [SMILES: O=C(OC1CCC(c2ccc(OCC3CO3)cc2)CC1)c1ccc(OCC2CO2)cc1]

A few minutes after the start of stirring, confirming that the mesogenic epoxy monomer was dissolved and the solution became clear, 4,4'-biphenol (Honshu Chemical Industry, Co., Ltd., hydroxy equivalent amount: 93 g/eq), as a specific aromatic compound, was added such that the equivalent ratio of epoxy group (A) of the mesogenic epoxy monomer to hydroxy group (B) of 4,4'-biphenol (A:B) was 10:2.5, and 0.5 parts by mass of a reaction adduct of tributylphosphine and hydroquinone (following structure, molecular weight: 212.42) were added as a reaction catalyst. After continuing the heating at 160° C. for 5 hours, the reaction solvent was evaporated under reduced pressure, and the residue was cooled to room temperature (25° C.). An epoxy resin (prepolymer) of Example 1, including a multimer generated by reaction of mesogenic epoxy monomer and 4,4'-biphenol and a mesogenic epoxy monomer remaining unreacted, was thus obtained.

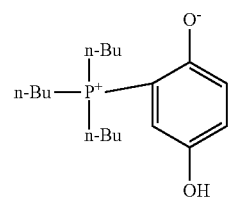

Example 2

An epoxy resin (prepolymer) was obtained in a similar manner to Example 1, except that a reaction adduct of triphenylphosphine and hydroquinone (following structure, molecular weight: 370.35) of the same amount was used as a reaction catalyst.

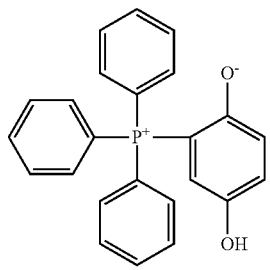 [SMILES: [O-]c1ccc(O)cc1[P+](c1ccccc1)(c1ccccc1)c1ccccc1]

Example 3

An epoxy resin including specific epoxy compound 2 as a mesogen-containing epoxy compound was synthesized by the following method.

To a 500-mL three-necked flask, 50 parts by mass of the mesogenic epoxy monomer used in Example 1 were placed, and 80 parts by mass of a solvent (propylene glycol monomethyl ether) were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 5.2 g of 4,4'-biphenol as a specific aromatic compound and 0.5 g of triphenylphosphine as a reaction catalyst were added. After continuing the heating at 120° C. for 3 hours, the solvent was evaporated under reduced pressure, and the residue was cooled to room temperature (25° C.). An epoxy resin (prepolymer), including a multimer generated by reaction of mesogenic epoxy monomer and 4,4'-biphenol (epoxy compound A) and a mesogenic epoxy monomer remaining unreacted, was thus obtained.

An epoxy resin (prepolymer), including a multimer generated by reaction of mesogenic epoxy monomer and hydroquinone (epoxy compound B) and a mesogenic epoxy monomer remaining unreacted, was obtained by the same process as described above, except that 3.1 g of hydroquinone were used instead of 5.2 g of 4,4'-biphenol.

An epoxy resin of Example 3, including specific epoxy compound 2, was obtained by mixing 35.0 g of the epoxy resin including epoxy compound A and 15.0 g of the epoxy resin including epoxy compound B.

Example 4

An epoxy resin including specific epoxy compound 3 as a mesogen-containing epoxy compound was synthesized by the following method.

To a 500-mL three-necked flask, 50 parts by mass of the mesogenic epoxy monomer used in Example 1 were placed, and 100 parts by mass of a solvent (propylene glycol monomethyl ether) were added. A cooling tube and a nitrogen inlet tube were attached to the flask, and a stirring blade was attached so as to be immersed in the solvent. Then, the flask was immersed in an oil bath at 150° C. and subjected to stirring.

After confirming that the mesogenic epoxy monomer was dissolved and the solution became clear, 2,2'-biphenol as a specific aromatic compound was added such that the equivalent ratio of epoxy group (A) of the mesogenic epoxy monomer to hydroxy group (B) of 2,2'-biphenol (A:B) was 10:2.5, and 0.5 parts by mass of triphenylphosphine were added as a reaction catalyst. After continuing the heating at 150° C. for 3 hours, the solvent was evaporated under reduced pressure, and the residue was cooled to room temperature (25° C.). An epoxy resin (prepolymer) of Example 4, including a multimer generated by reaction of mesogenic epoxy monomer and 2,2'-biphenol and a mesogenic epoxy monomer remaining unreacted, was thus obtained.

Comparative Example 1

An epoxy resin (prepolymer) of Comparative Example 1, including a multimer obtained by reaction of mesogenic epoxy monomer and 4,4'-biphenol and a mesogenic epoxy monomer remaining unreacted, was obtained by the same process as Example 1, except that the reaction catalyst was changed from a reaction adduct of tributylphosphine and hydroquinone to the same amount of triphenylphosphine.

The epoxy resin was subjected to GPC by the same conditions as Example 1 to determine whether or not the epoxy resin includes an epoxy compound having a branch. As a result, a peak corresponding to an epoxy compound having a branch was not observed.

Measurement of Dynamic Shear Viscosity of Epoxy Resin

The dynamic shear viscosity of the epoxy resin was measured with a rheometer. Specifically, an initial dynamic shear viscosity η'1 (Pa·s) and a maximum value of dynamic shear viscosity η'2 (Pa·s) were measured with a gap between a parallel plate and a stage of a rheometer (MCR-301 from Anton-Paar GmbH) of 0.05 mm, a frequency of 0.5 Hz, a strain of 8000%, and a temperature of 80° C. (constant), over 80 minutes in a continuous manner.

<Preparation of Epoxy Resin Composition>

The epoxy resin was placed in a plastic container and heated at 90° C. in a thermostatic chamber. To the epoxy resin, 3,3'-diaminodiphenylsulfone (Fujifilm Wako Pure Chemical Corporation) was added as a curing agent, such that the equivalent ratio of epoxy group of the epoxy resin to active hydrogen of the curing agent was 1:1, and the mixture was stirred with a spatula for 1 minute. Subsequently, the mixture was stirred with a planetary centrifugal mixer at 1,600 rotations/min (rpm) for 30 minutes, thereby preparing an epoxy resin composition. Prior to the mixing, 3,3'-diaminodiphenylsulfone was subjected to pulverization to have an average particle size of 8 μm.

Measurement of Dynamic Shear Viscosity of Epoxy Resin Composition

The dynamic shear viscosity of the epoxy resin composition was measured by using a rheometer. Specifically, an initial dynamic shear viscosity η'3 (Pa·s) and a maximum value of dynamic shear viscosity η'4 (Pa·s) were measured with a gap between a parallel plate and a stage of a rheometer (MCR-301 from Anton-Paar GmbH) of 0.2 mm, a frequency of 1 Hz, a strain of 1000%, and a temperature of 80° C. (constant), over 120 minutes in a continuous manner.

Evaluation of Properties of Cured Product

The epoxy resin composition was placed in a stainless dish and cooled to room temperature (25° C.). Then, the epoxy resin composition was taken out from the stainless dish and cured by heating in a thermostat chamber at 230° C. for 1 hour. A sample for evaluating fracture toughness, having a size of 2 mm×0.5 mm×40 mm, and a sample for evaluating elasticity, having a size of 50 mm×5 mm×2 mm, were prepared from the epoxy resin cured product.

Evaluation of Elasticity

As an index for the elasticity of the epoxy resin cured product, the bending elastic modulus of the sample was measured. Specifically, the sample was subjected to a three-point bending test based on ASTM D790, using Instron 5948 (Instron), at a distance between the points of 32 mm and a test rate of 1 mm/min. The results are shown in Table 1.

Evaluation of Toughness

As an index for the toughness of the epoxy resin cured product, the fracture toughness (MPa·m$^{1/2}$) of the sample was calculated based on the result of three-point bending test based on ASTM D5045, using Instron 5948 (Instron). The results are shown in Table 1.

<Existence or Non-Existence of Smectic Structure>

In order to determine whether or not a smectic structure was formed in the epoxy resin cured product, an X-ray diffraction measurement was performed using CuKα 1 line under a tube voltage of 40 kV, a tube current of 20 mA, a scan rate of 0.03°/min and a measurement range 2θ=2° to 30°. When a diffraction peak is observed in a range of 2θ=2° to 10°, it was determined that a smectic structure is formed in the epoxy resin cured product. The results are shown in Table 1, wherein YES indicates that a smectic structure is formed Proportion of Epoxy Compound Having Branch (Branch Ratio)

The proportion of an epoxy compound having a branch included in the epoxy resin synthesized by the above process was calculated by GPC. Specifically, an absorbance at a wavelength of 280 nm of the epoxy resin was detected to obtain a chart, and the area A and the area B were calculated from the total area of the all peaks, respectively. Then, the proportion of the area B with respect to area A (%) was calculated from the area A and the area B as described below.

Area A: an area obtained by subtracting an area of a peak corresponding to an epoxy compound having only one mesogenic structure (unreacted mesogenic epoxy monomer) from the total area of all peaks shown in a GPC chart Area B: an area of a peak corresponding to an epoxy compound that is a dimer formed of two mesogenic epoxy monomers and has one branch (formed as a result of reaction between a secondary hydroxy group, generated from a mesogenic epoxy monomer and a specific aromatic compound, and a different mesogenic epoxy monomer)

The GPC measurement was performed by using GPC columns (for example, G2000HXL and G3000 HXL from Tosoh Corporation) and tetrahydrofuran as a mobile phase, at a sample concentration of 0.2% by mass and a flow rate of 1.0 ml/min. The calibration curve is obtained using a polystyrene standard sample, and Mn was calculated based on polystyrene.

Evaluation of Processing Compatibility

An epoxy resin composition was prepared from the epoxy resin and 3,3'-diaminodiphenylsulfone (Fujifilm Wako Pure Chemical Corporation) at an equivalent ratio of epoxy group of the epoxy resin and active hydrogen of the curing agent of 1:1. The materials were placed in a container of a planetary mixer and heated at 80° C. to melt the same. Then, the materials were mixed at 20 rotations/min (rpm) for 60 minutes, thereby preparing an epoxy resin composition. Prior to the mixing, 3,3'-diaminodiphenylsulfone was pulverized to have an average particle size of 8 μm.

Subsequently, application suitability of the epoxy resin composition was evaluated by the following process.

On a hot plate heated at 90° C., a stainless plate was placed and sufficiently heated, and a PET film was placed on the stainless plate and fixed. Then, approximately 3 g of the epoxy resin composition was placed on the PET film and melted. Thereafter, the epoxy resin composition was spread on the PET film with an applicator heated at 90° C. with a gap of 100 μ. The application suitability was evaluated by the following criteria, and the results are shown in Table 1.

A: Epoxy resin maintains fluidity and can be spread by 10 cm while maintaining a uniform appearance.

B: Epoxy resin maintains fluidity and can be spread by 10 cm but with a partly uneven appearance.

C: Epoxy resin coagulates and cannot be uniformly spread, or alternatively, the epoxy resin is highly viscous and cannot be spread over 10 cm or cannot be spread at all.

TABLE 1

|  | Epoxy resin | | Epoxy resin composition | | Epoxy resin cured product | | | Branch ratio [%] | Processing compatibility |
|  | $\eta'1$ [Pa·s] | $\eta'2/\eta'1$ | $\eta'3$ [Pa·s] | $\eta'4/\eta'3$ | Bending elasticity [GPa] | Fracture toughness [MPa·m$^{1/2}$] | Smectic structure | | |
|---|---|---|---|---|---|---|---|---|---|
| Example 1 | 19 | 1.03 | 92 | 1.03 | 2.6 | 2.0 | YES | 8.4 | A |
| Example 2 | 13 | 1.1 | 50 | 1.2 | 2.5 | 2.1 | YES | 4 | A |
| Example 3 | 9.2 | 1.4 | 45 | 1.4 | 2.7 | 2.0 | YES | — | A |
| Example 4 | 40 | 2.8 | 163 | 2.9 | 3.0 | 1.9 | YES | — | A |
| Comparative Example 1 | 8.6 | >10 | 24 | >10 | 2.6 | 1.9 | YES | — | C |

In Table 1, "-" indicates that a peak derived from an epoxy compound having a branch is not observed or that it is difficult to divide the chart into peaks.

As shown in Table 1, the epoxy resin composition including the epoxy resin prepared in Examples 1-4 and a curing agent exhibits a suppressed increase ratio in viscosity upon application of shear stress, and exhibits excellent viscosity stability and processing compatibility. In addition, the epoxy resin cured product obtained by curing the epoxy resin composition including the epoxy resin prepared in the Examples has a smectic structure formed therein and exhibits excellent fracture toughness.

The epoxy resin composition including the epoxy resin prepared in Comparative Example 1 and a curing agent exhibits a significantly high increase ratio in viscosity upon application of shear stress. The viscosity of the epoxy resin composition is significantly increased when it is mixed in a planetary mixer, and the epoxy resin composition cannot be spread due to insufficient fluidity.

The disclosure of International Application No. PCT/JP2018/015114 and Japanese Patent Application No. 2018-075649 is incorporated herein in its entirety by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. An epoxy resin, comprising an epoxy compound having a mesogenic structure, and having a value η'2/η'1 equal to 3 or less, wherein η'1 is an initial dynamic shear viscosity in Pa·s and η'2 is a maximum value of dynamic shear viscosity in Pa·s, in a measurement of dynamic shear viscosity, wherein the initial dynamic shear viscosity η'1 and the maximum value of dynamic shear viscosity η'2 are measured with a rheometer, with a gap between a parallel plate and a stage of the rheometer of 0.05 mm, a frequency of 0.5 Hz, a strain of 8000%, and a constant temperature of 80° C., over 80 minutes in a continuous manner, and wherein the epoxy compound is represented by the following Formula (1):

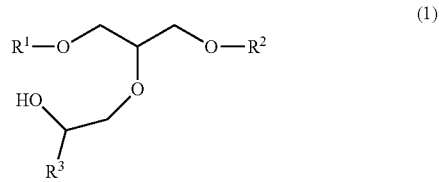

wherein, in Formula (1), each of $R^1$, $R^2$ and $R^3$ independently represents a monovalent group, at least one of the monovalent groups represented by $R^1$, $R^2$ and $R^3$ includes a mesogenic structure, and at least one of the monovalent groups represented by $R^1$, $R^2$ and $R^3$ has an epoxy group.

2. The epoxy resin according to claim 1, comprising an epoxy compound A having two or more mesogenic structures and at least one phenylene group, and an epoxy compound B having two or more mesogenic structures and at least one divalent biphenyl group.

3. The epoxy resin according to claim 1, comprising an epoxy compound having two aromatic rings that form a divalent biphenyl structure, and having mesogenic structures that are independently bonded to each of the two aromatic rings, wherein at least one of the mesogenic structures is bonded to the aromatic ring at an angle to the molecular axis of the biphenyl structure.

4. The epoxy resin according to claim 1, wherein the initial dynamic shear viscosity η'1 is 200 Pa·s or less.

5. An epoxy resin composition, comprising the epoxy resin according to claim 1, and a curing agent.

6. An epoxy resin cured product obtained by curing the epoxy resin composition according to claim 5.

7. A composite material, comprising the epoxy resin cured product according to claim 6, and a reinforcing member.

* * * * *